May 26, 1970  J. E. BRADLEY ETAL  3,513,534
METHOD AND APPARATUS FOR ASSEMBLING A JOINT
Filed March 12, 1968  3 Sheets-Sheet 3
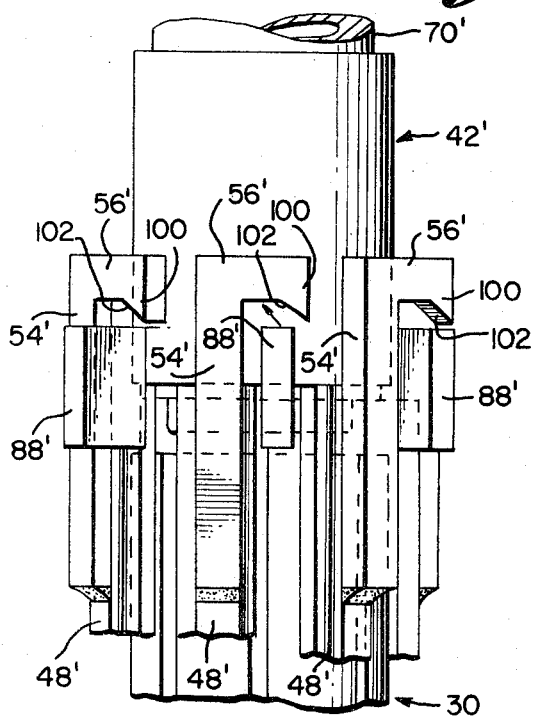
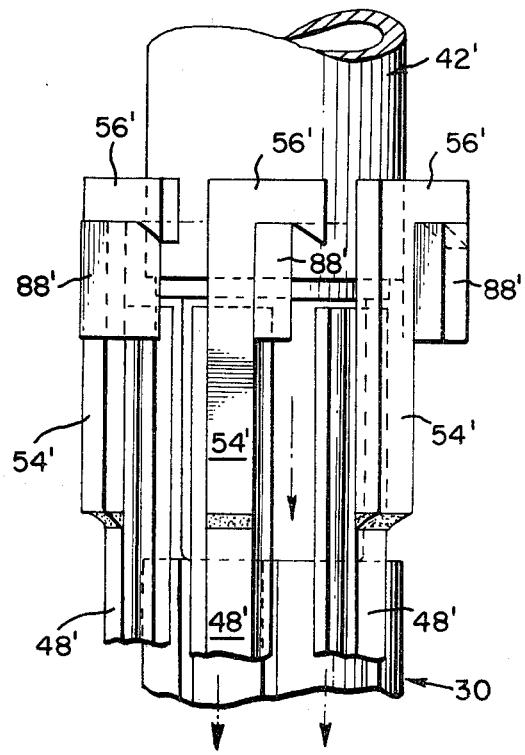
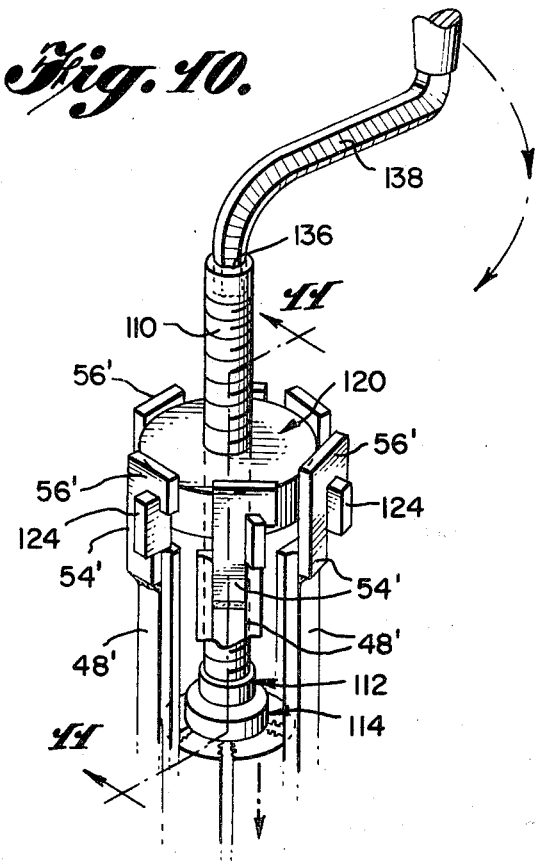
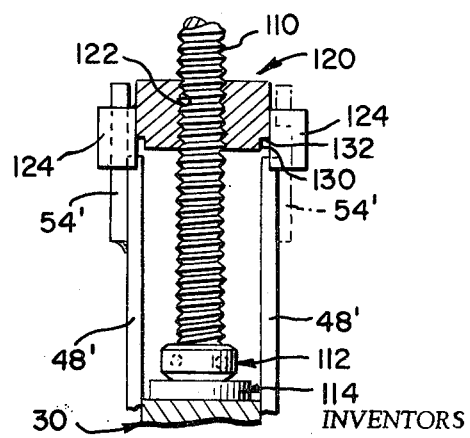
INVENTORS
JAMES E. BRADLEY,
LONNIE L. CALDWELL &
RAY J. GABLER
BY Shoemaker and Mattare
ATTORNEYS

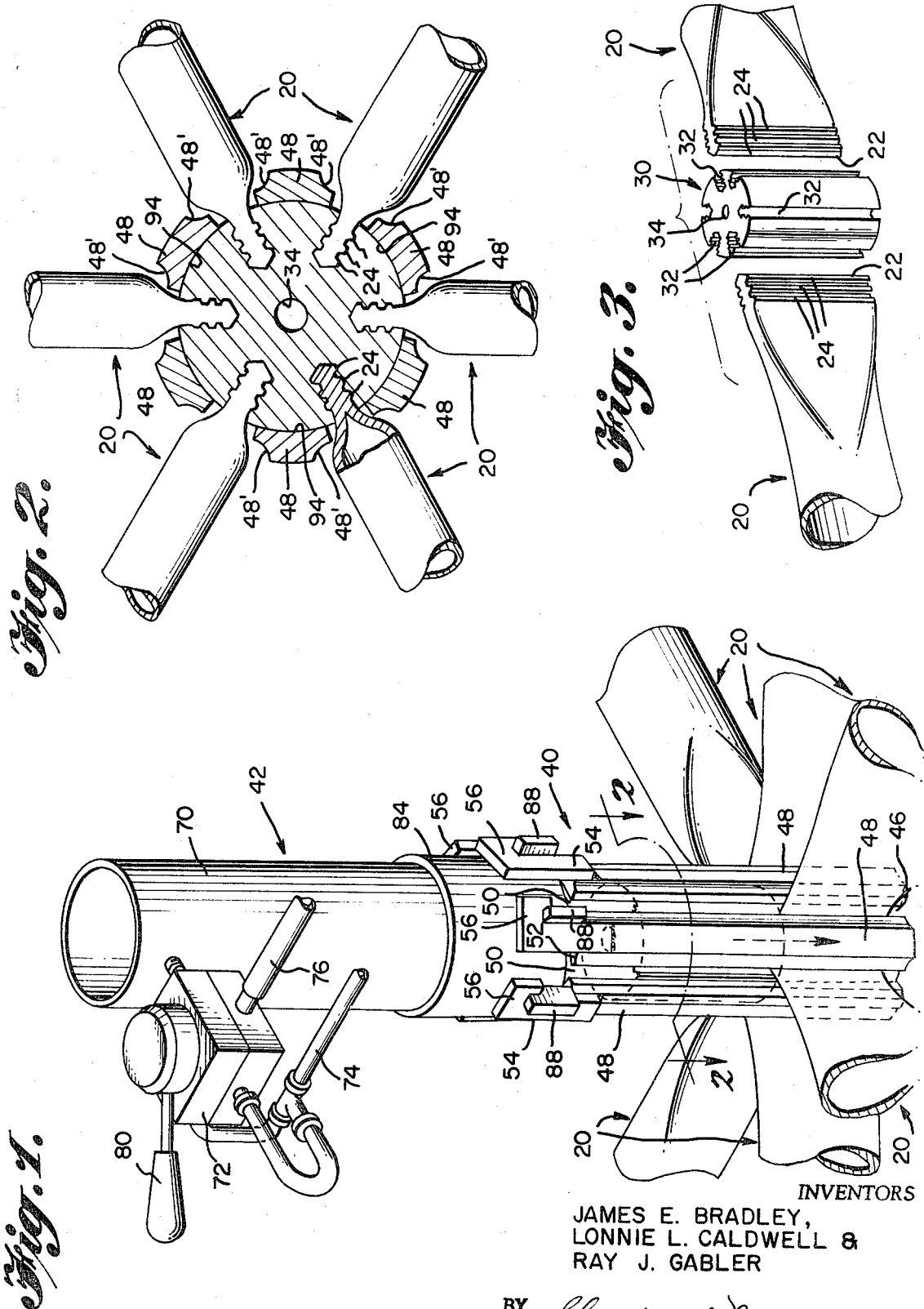

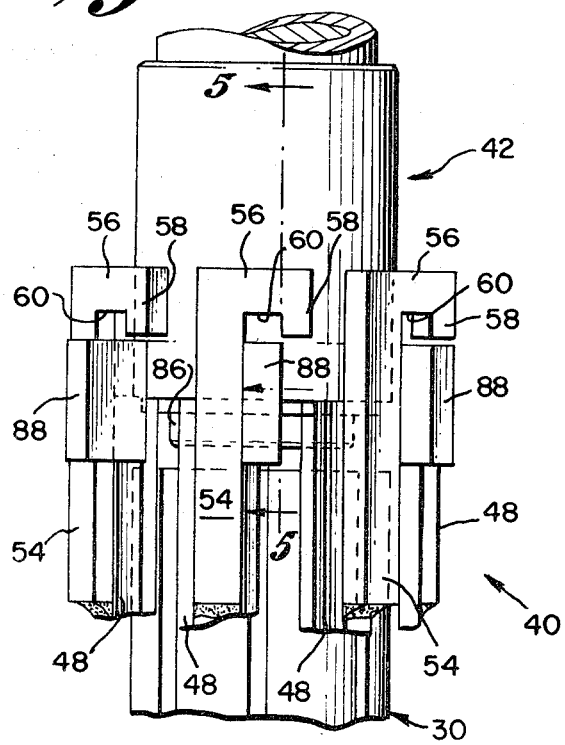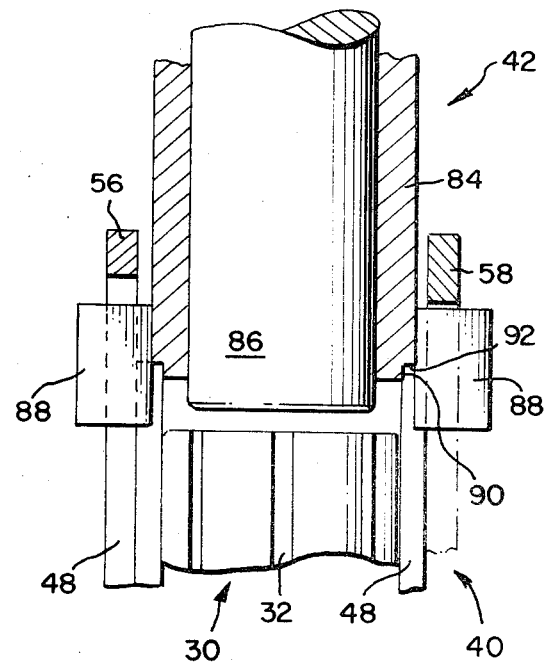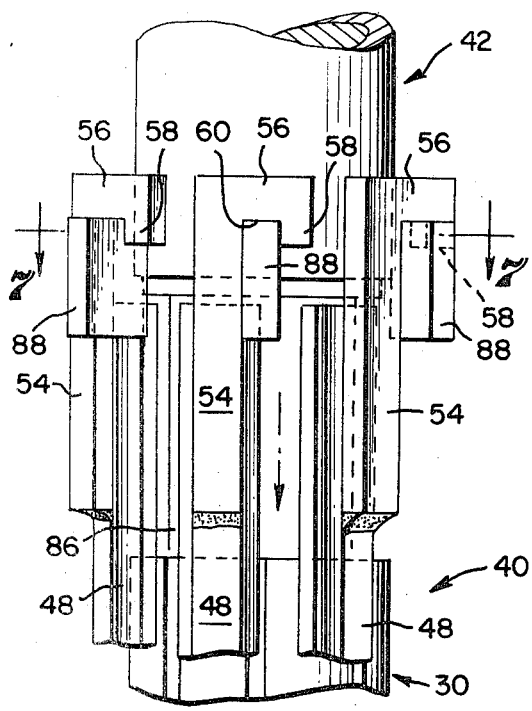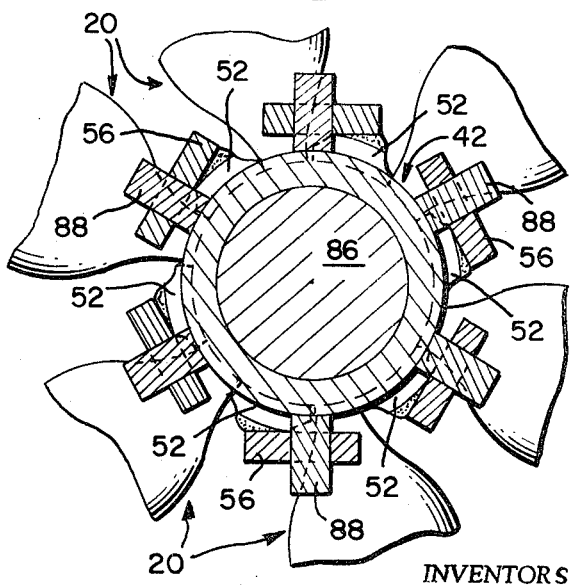

United States Patent Office 3,513,534
Patented May 26, 1970

1

3,513,534
METHOD AND APPARATUS FOR
ASSEMBLING A JOINT
James E. Bradley, Lonnie L. Caldwell, and Ray J. Gabler, Kansas City, Mo., assignors to Butler Manufacturing Company, Kansas City, Mo., a corporation of Missouri
Filed Mar. 12, 1968, Ser. No. 712,404
Int. Cl. B23q *3/00;* B23p *19/00*
U.S. Cl. 29—468
13 Claims

ABSTRACT OF THE DISCLOSURE

A guide means is provided defining a plurality of spaced slots for receiving the flattened ends of structural members, said ends having spaced ribs thereon. The guide means includes an open end portion which slidably receives a hub having keyways therein complementary to said flattened ends for receiving the ends therewithin. Actuating means is operatively connected with the guide means adjacent the open end portion thereof and includes a part engaging said hub for moving the hub slidably within the guide means and longitudinally thereof to force the flattened ends of said structural members into the keyways in said hub.

BACKGROUND OF THE INVENTION

The present invention relates to a method and apparatus for assembling joints wherein the flattened ends of structural members are to be forced into keyways formed in a cooperating hub.

The present invention relates to joints of the type as shown for example in U.S. Pat. No. 2,895,753 wherein a hub is provided with one or more radially disposed tapered keyways extending the length of the hub and open at both ends thereof and having longitudinally extending recesses in the lateral walls of the keyways and defining ribs between such recesses. The cooperating structural member may for example comprise a tube with a flattened or coined end, transverse ribs being formed on the outer walls of the flattened end of the structural member and fitting frictionally and resiliently within the keyway provided in the hub for securely interlocking the structural member and the hub. The structural member may of course comprise conventional members other than tubes such as rods, angles, plates and the like. While the hub is illustrated in the patent as being generally cylindrical in shape, the hub may also be of other configurations as desired.

Various constructions may be formed utilizing this type of joint, and U.S. Pat. No. 2,976,968 illustrates a wall construction employing this type of joint. The joint may of course be utilized for forming domes, and various other structural arrangements.

This type of joint has proved to be most effective in building lightweight frameworks, but the joint has presented a number of difficulties involved in the assembly thereof.

The structural members and hub of this type of prior art joint are conventionally assembled manually either by using a mallet or some other means for driving the flattened ends of the structural members into the hub keyways, or by using a C-clamp or similar arrangement. This type of manual assembly is very slow and time consuming and requires a considerable amount of physical force especially in those cases where there is a relatively tight fit between the flattened ends of the structural members and the hub.

SUMMARY OF THE INVENTION

The present invention provides an arrangement whereby power-operated actuating means, or other type of actuating means providing a substantial mechanical advantage is enabled to force a plurality of flattened ends of structural members into the keyways of the hubs substantially simultaneously and without producing any undue degree of cocking of the stsructural members with respect to the hub.

A guide means is provided for holding the structural members in operative position and for accurately guiding movement of the hub with respect to the structural members whereby an effective joint is obtained.

The arrangement of the present invention considerably speeds up the assembly of the joint, and in many cases the joint may be assembled in one-half the time or less than previously required in the art. Additionally, very little physical effort is provided when utilizing the arrangement of the present invention thereby greatly facilitating assembly.

Additionally, the apparatus of the present invention is readily portable and enables the apparatus to be carried aloft on scaffolding or the like or to various other points at a construction site wherever it is needed.

An object of the present invention is to provide a new and novel method and apparatus for assembling a joint which enables the joint to be assembled quicker and with less effort than has previously been required in the prior art, and which at the same time is sufficiently small and lightweight as to be readily portable.

BRIEF DESCRIPTION OF THE DRAWINGS

FIG. 1 is a top perspective view illustrating the apparatus of the present invention in operative position for assembling a joint;

FIG. 2 is a sectional view taken substantially along line 2—2 of FIG. 1 looking in the direction of the arrows;

FIG. 3 is a top perspective view illustrating the ends of two structural members and the cooperating hub for interconnecting the structural members;

FIG. 4 is a side view on an enlarged scale illustrating the details of construction of the upper end of the guide means and the lower end of the actuating means;

FIG. 5 is a sectional view taken substantially along line 5—5 of FIG. 4 looking in the direction of the arrows;

FIG. 6 is a view similar to FIG. 4 illustrating the parts in a different operative relationship with respect to one another;

FIG. 7 is a sectional view taken substantially along line 7—7 of FIG. 6 looking in the direction of the arrows;

FIG. 8 is a view similar to FIG. 4 illustrating a modification of the invention;

FIG. 9 is a view of the structure shown in FIG. 8 with the parts in a different operative relationship with respect to one another;

FIG. 10 is a top perspective view illustrating a modified form of actuating means; and FIG. 11 is a sectional view taken substantially along line 11—11 of FIG. 10 looking in the direction of the arrows.

DESCRIPTION OF THE PREFERRED EMBODIMENTS

Referring now to the drawings wherein like reference characters designate corresponding parts throughout the several views, as seen most clearly in FIGS. 2 and 3, the structural members 20 are illustrated as being of tubular metallic construction and may be formed of aluminum for example. These structural members have flattened ends 22 provided with transverse ribs 24 thereon. This construction is substantially identical with that illustrated in U.S. Pat No. 2,895,753.

A hub indicated generally by reference numeral 30 may be formed of a similar metallic substance as the structural members 20, the hub being provided with a plurality of radially disposed tapered keyways 32 extending the length of the hub and being open at opposite ends thereof, these keyways having longitudinally extending recesses formed therein for receiving the ribs 24 on the ends of the structural members. This hub is of similar construction to that illustrated in the aforementioned U.S. patents. The hub is also provided with a central bore 34 extending therethrough which is adapted to receive a bolt for retaining washers at opposite ends of the hub after the assembly is completed to prevent the structural members associated therewith from subsequently working out of the hub.

As illustrated, the hub is of generally cylindrical outer configuration and is provided with six equally spaced keyways formed therein. It is apparent that the outer shape of the hub may be varied, and that the number of keyways may also be altered as desired.

As seen in FIG. 1, the apparatus for assembling the joint including the structural members and the hub includes a guide means indicated generally by reference numeral 40 and an actuating means indicated generally by reference numeral 42, these components being illustrated in operative position for forcing the flattened ends of the structural members into the keyways of the hub as seen in FIG. 1.

The guide means 40 includes a base member 46 which may be a disc member, and a plurality of members 48 are provided, the members 48 being illustrated as being six in number and being suitably secured as by welding to the outer surface of the base member 46. Members 46 and 48 are formed of a suitable strong material such as steel or the like, and members 48 are equally spaced about the base member to define six generally parallel slots 50 between members 48, these slots being adapted to receive the flattened ends of the structural members 20 previously described. Accordingly, six structural members 20 may be inserted through the lower portions of the slots 50 defined by members 48 as seen in FIG. 1, the flattened ends of the structural members resting upon the base member 46.

The upper ends 52 of members 48 are spaced from one another and lie substantially in a plane to define a support shoulder which of course is interrupted by the slots 50, this support shoulder being adapted to engage and support a portion of the actuating means as hereinafter described.

A plurality of retainer members 54 which are also formed of a rigid substance such as steel are fixedly secured to the outer surface of the upper ends of members 48 as by welding or the like. Each of members 54 includes a portion 56 which extends substantially normal to the longitudinal axis of the guide means, each of portions 56 in turn joins with a depending lip 58. A space 60 is defined as seen most clearly in FIG. 4 by the upper portion of each of the retainer members 54 for a purpose hereinafter described.

Referring again to FIG. 1, the actuating means includes a conventional hydraulic cylinder 70 which is operatively connected with a conventional valve mechanism 72. Conduits 74 and 76 operatively connected with the valve means are in turn connected with a suitable source of hydraulic pressure. In a typical example, the hydraulic pressure may be on the order of 10,000 p.s.i. A manually operable handle 80 is provided for actuating the valve mechanism for extending and retracting the ram or piston 86 slidably mounted within the hydraulic cylinder, this ram or piston being more clearly seen in FIGS. 4–7 inclusive.

As seen most clearly in FIG. 5, a fitting 84 is secured to the lower end of the hydraulic cylinder by any suitable means such as threads or the like, this fitting having a plurality of equally spaced rigid retainer lugs 88 which in this case may be six in number formed integral therewith.

As seen in FIG. 5, the lower end of fitting 84 is provided with an annular recess formed in the lower outer end thereof to define an indexing surface 90 and a support surface 92.

When it is desired to employ the apparatus illustrated in FIGS. 1 and 4–7 inclusive for assembling a joint, the flattened ends of the structural members are first inserted through the slots provided in the guide means. As illustrated, six structural members are utilized, but it is apparent that any suitable number of structural members may be inserted through the slots in the guide means as necessary.

The hub 30 previously described is then slid into the interior of the guide means as defined by the inner surfaces of members 48. In the present case, the members 48 have arcuate inner surfaces which cooperate to define a generally cylindrical surface which is complementary to the outer surface of the hub whereby the hub is effectively guided in its movement. These arcuate surfaces may be seen most clearly in FIG. 2 and are indicated by reference numerals 94.

The flattened ends of the various structural members are then manually aligned with the keyways in the hub to ensure that the keyways and flattened ends of the structural members are properly aligned before the actuating means is operated.

The actuating means is then lowered into place assuming that the guide means is disposed in a vertical position as illustrated. The actuating means will be lowered until the indexing surface 90 thereof fits within the upper ends of members 48, the indexing surface serving to properly align the actuating means with respect to the guide means. Downward movement of the actuating means will be limited by interengagement of the support surface 92 of the actuating means with the upper ends 52 of the members 48. The actuating means is then supported by the guide means.

At this point, the upper surface of lugs 88 is disposed slightly beneath the lower surface of lips 58 on the various retainer members of the guide means whereby the actuating means may be rotated so that the lugs are moved into the position shown in FIGS. 4 and 5 beneath the space 60 defined by the retainer members 54. The apparatus is then disposed in position for operation thereof.

Hydraulic pressure is then applied to the hydraulic cylinder to move the ram or piston 86 thereof downwardly whereupon the parts of the apparatus assume the operative relationship shown in FIGS. 6 and 7. Upon the application of downward pressure, the actuating means will move up with respect to the guide means initially until the upper surfaces of the lugs 88 engage the undersurfaces of portions 56 of the retainer members 54. The piston or ram 86 will then urge the hub 30 downwardly whereupon the flattened ends of the structural members will be forced into the keyways of the hub thereby substantially simultaneously assembling each of the structural members with respect to the hub.

As noted in FIG. 2, each of the members 48 include longitudinally extending arcuate cutouts 48' at opposite sides thereof, these cutouts enabling the actuating means to be readily rotated since the lugs formed on the actuating means move into these cutouts when the actuating means is rotated into operative relationship with respect to the guide means.

After the joint has been assembled, the ram or piston of the actuating means is withdrawn back into the hydraulic cylinder, whereupon the lugs move from the position shown in FIGS. 6 and 7 to the position shown in FIGS. 4 and 5. The actuating means can then be rotated in the opposite direction to that previously described so as to dispose the lugs 88 in position to be withdrawn through the spaces between adjacent retainer members 54.

The assembled joint can then be removed from the guide means by sliding the entire assembly upwardly whereupon the structural members will pass outwardly through the slots 50 and the spaces defined between adjacent retainer members 54.

Referring now to FIGS. 8 and 9 of the drawings, the apparatus is substantially identical with that previously described, and similar parts have been given the same reference numerals primed. The only difference in this form of the invention is the fact that the depending lip 100 is provided with a sloping cam surface 102. As seen in FIG. 8, the lugs 88' may not be quite properly aligned when the actuating means is rotated into operative position. However, upon relative upward movement of the actuating means with respect to the guide means, the cam surface 102 will cause the lugs to be moved into the proper operative relationship as seen in FIG. 9.

Referring now to FIGS. 10 and 11, a further modified form of the invention is illustrated. The same guide means as described previously is employed in this form of the invention. The actuating means in this case comprises an elongated threaded member 110 which has a thrust bearing 112 disposed at the lower end thereof adjacent a plate 114 adapted to engage the upper end of a hub 30. The plate 114 is of course carried by the member 110 as is the bearing 112.

A member 120 is provided with a threaded bore 122 formed therethrough, member 120 having retainer lugs 124 similar to the lugs 88 previously described secured to the outer surface thereof. These retainer lugs are adapted to cooperate with the guide means as described previously.

Member 120 is provided with an indexing surface 130 and a support surface 132 corresponding to the indexing and support surfaces previously described for properly positioning the actuating means on the guide means.

As seen in FIG. 10, the upper end of member 110 is provided with a hex socket 136 which receives a correspondingly shaped lower end of an operating handle 138 or other suitable means such as a ratchet wrench or a power driven impact wrench and the like.

When the apparatus is mounted in the operative position shown in FIG. 10, rotation of handle 138 causes the threaded member 110 to be moved either up or down as the case may be for urging the hub into operative position when it moves downwardly, and to release the mechanism when it moves upwardly.

It is apparent from the foregoing that there is provided according to the present invention a new and novel method and apparatus for assembling a joint wherein the joint may be assembled in a minimum amount of time with little physical effort on the part of the user. The components may be relatively small, and in a typical example the guide means may have a height of approximately 18 inches, and the actuating means may be of approximately the same size. In the case of the actuating means illustrated in FIGS. 10 and 11, the over-all height thereof may be less than 12 inches.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Apparatus for assembling a joint comprising guide means including a side portion defining elongated slot means therethrough for receiving the flattened end of a structural member, said guide means including an open end for slidably receiving a hub, actuating means including a portion for engaging a hub disposed within said guide means and for forcing the hub longitudinally with respect to the guide means to force the flattened end of a structural member into a keyway formed in the hub, and means for retaining said guide means and said actuating means in operative relationship during operation of the apparatus.

2. Apparatus as defined in claim 1 wherein said side portion includes a plurality of spaced portions extending substantially parallel with one another and defining a plurality of spaced generally parallel slots.

3. Apparatus as defined in claim 1 wherein said guide means includes a base at one end for supporting one or more structural members, said base being disposed at the opposite end of said guide means from said open end.

4. Apparatus as defined in claim 3 wherein said guide means includes a support shoulder formed adjacent said open end of the guide means.

5. Apparatus as defined in claim 1 wherein said retaining means includes a plurality of spaced retainer members disposed adjacent the open end of said guide means.

6. Apparatus as defined in claim 5 wherein each of said retainer members includes a portion extending generally normal to the longitudinal axis of the guide means, each of said retainer members also including a lip portion extending generally parallel with the longitudinal axis of said guide means.

7. Apparatus as defined in claim 6 wherein said lip portion has a sloping cam surface formed thereon.

8. Apparatus as defined in claim 1 wherein said actuating means includes an indexing surface formed thereon for engaging a portion of said guide means to properly position the actuating means with respect to the guide means.

9. Apparatus as defined in claim 1 wherein said actuating means has a support surface formed thereon, said guide means including a support shoulder for engaging said support surface.

10. Apparatus as defined in claim 1 wherein said retaining means includes a plurality of spaced retainer lugs carried by said actuating means.

11. The method of assembling a joint comprising providing a guide means having a side portion including elongated slot means formed therethrough, said guide means having an open end, inserting the flattened end of a structural member through said slot means, slidably mounting a hub having keyway means therein within said guide means, manually aligning the flattened end of said structural member with the keyway means of said hub, and then forcing said flattened end of the structural member into the keyway means of said hub.

12. The method as defined in claim 11 including the additional steps of providing an actuating means interengageable with said hub, and wherein said actuating means is power-actuated for forcing said hub longitudinally with respect to the guide means to thereby force the flattened end of said structural member into said keyway means of the hub.

13. The method as defined in claim 11 wherein said guide means is provided with a plurality of slots, providing actuating means, and wherein a plurality of flattened ends of structural members are inserted through said slots, said hub having a plurality of keyway means formed therein, manually aligning the flattened end of each of said structural members with one of the keyway means in said hub, and then operating said actuating means to move the hub longitudinally with respect to the guide means and substantially simultaneously force the flattened end of each of said structural members into one of said keyway means.

References Cited

UNITED STATES PATENTS 2,607,816   8/1952   Ryder et al.
3,079,681   3/1963   Fentiman _____ 29—525

WILLIAM I. BROOKS, Primary Examiner

U.S. Cl. X.R.

29—159.03, 200, 238, 525